(12) United States Patent
Qu et al.

(10) Patent No.: US 11,871,880 B2
(45) Date of Patent: Jan. 16, 2024

(54) SOLID-LIQUID SEPARATION ANTI-SOILING TOILET, MOUNTING METHOD AND APPLICATION OF SOLID-LIQUID SEPARATION ANTI-SOILING TOILET

(71) Applicant: CHINA ACADEMY OF AEROSPACE AERODYNAMICS, Beijing (CN)

(72) Inventors: Wei Qu, Beijing (CN); Bangcheng Ai, Beijing (CN); Minghui Xie, Beijing (CN)

(73) Assignee: CHINA ACADEMY OF AEROSPACE AERODYNAMICS, Beijing (CN)

( * ) Notice: Subject to any disclaimer, the term of this patent is extended or adjusted under 35 U.S.C. 154(b) by 39 days.

(21) Appl. No.: 17/622,717

(22) PCT Filed: Nov. 22, 2019

(86) PCT No.: PCT/CN2019/120175
§ 371 (c)(1),
(2) Date: Dec. 24, 2021

(87) PCT Pub. No.: WO2021/008053
PCT Pub. Date: Jan. 21, 2021

(65) Prior Publication Data
US 2022/0240734 A1  Aug. 4, 2022

(30) Foreign Application Priority Data

Jul. 17, 2019 (CN) .......................... 201910646693.4

(51) Int. Cl.
*A47K 11/02* (2006.01)
*C02F 11/13* (2019.01)
*C02F 11/121* (2019.01)

(52) U.S. Cl.
CPC .............. *A47K 11/02* (2013.01); *C02F 11/13* (2019.01); *C02F 11/121* (2013.01)

(58) Field of Classification Search
CPC .............................. A47K 11/02; A47K 11/023
See application file for complete search history.

(56) References Cited

U.S. PATENT DOCUMENTS 5,991,931 A * 11/1999 Hawkins .............. A47K 11/023
4/111.4
6,101,638 A * 8/2000 Hammond ........... A47K 11/023
4/111.1

(Continued)

FOREIGN PATENT DOCUMENTS

CN      201190122 Y    2/2009
CN      101492232 A    7/2009

(Continued)

*Primary Examiner* — Janie M Loeppke
(74) *Attorney, Agent, or Firm* — Gamg Yu

(57) ABSTRACT

Disclosed are a solid-liquid separation anti-soiling toilet, a mounting method and a use. The solid-liquid separation anti-soiling toilet is composed of a processor, a solid container, a liquid reservoir and an exhaust device, where the processor is connected to the solid container, the processor includes a housing, and a clamping device and a drying device which are arranged inside the housing, excreta generated after use of the toilet enters the clamping device of the processor, a liquid in the excreta enters the liquid reservoir after passing through the clamping device, a solid in the excreta is pressed and dried into a sheet inside the clamping device, and enters the solid container, and hot air flow generated by the drying device is used for drying the solid inside the clamping device, and is exhausted outwards through the exhaust device connected to the housing of the processor.

17 Claims, 11 Drawing Sheets

(56) References Cited

U.S. PATENT DOCUMENTS 8,533,873 B2 * 9/2013 West, Jr. .............. A47K 11/023
4/111.4
2015/0143626 A1 5/2015 Dreher

FOREIGN PATENT DOCUMENTS

| | | |
|---|---|---|
| CN | 102836866 A | 12/2012 |
| CN | 207276468 U | 4/2018 |
| CN | 108751659 A | 11/2018 |
| CN | 208785888 U | 4/2019 |
| CN | 208791455 U | 4/2019 |
| CN | 109896719 A | 6/2019 |
| CN | 109965762 A | 7/2019 |
| CN | 110301852 A | 10/2019 |
| CN | 110353549 A | 10/2019 |
| JP | 2003204898 A | 7/2003 |

* cited by examiner

SOLID-LIQUID SEPARATION ANTI-SOILING TOILET, MOUNTING METHOD AND APPLICATION OF SOLID-LIQUID SEPARATION ANTI-SOILING TOILET

CROSS-REFERENCE TO RELATED APPLICATION

The disclosure claims the priority of Chinese Patent Application No. 201910646693.4, filed to the Chinese Patent Office on Jul. 17, 2019 and entitled "Solid-Liquid Separation Anti-Soiling Toilet, Mounting Method and Use", which is incorporated herein in its entirety by reference.

TECHNICAL FIELD

The present disclosure relates to a solid-liquid separation anti-soiling toilet, a mounting method and a use, and belongs to the technical field of environmental protection and energy saving.

BACKGROUND

"Waterless toilet" on the market at present is a toilet without a water tank. The working principle of the waterless toilet is intelligently distinguish the amount of excreta in its barrel based on urban tap water pressure and the principle of hydrodynamics, and selects a reasonable flush volume to ingeniously match flush kinetic energy, which saves at least half of water. Essentially, it does not truly avoid water use. It is more reasonable to call the "waterless toilet" a water-saving toilet.

In rural and remote areas, a large number of outhouses are still widespread, which are called latrines or latrine pits. Except for convenient construction, they have soil and groundwater pollution, difficult waste disposal and poor toilet use feeling. Infrastructures may be incomplete for upgrading the toilets. However, it will be costly to build a normal water closet which requires supporting water pipes and sewer pipes to be laid. In addition, since the remote areas also face water deficiency, it is difficult to popularize the water-saving toilet.

Since early space flights were short, astronauts had to take sufficient disposable excreta collection bags, so as to bag excreta in space. Bag openings have elastic cords, and are opened to be fixed at an opening end of a toilet in use. A series of small holes are formed in a bottom of an inner wall of a toilet liner. During use, a suction pipe connected to an outer barrel is used to form certain negative pressure. The bag opening is automatically tightened when the collection bag is removed after use. The collection bag containing waste is put in an outer packaging bag before put into a special waste box.

In *Manned Spacecraft Technology* (Qi Faren, National Defense Industry Press, 1999), FIGS. 5-15 in P134 show schematic diagrams of an internal structure of a space shuttle combined toilet that uses a receiver in a two-way structure, one of which is for air, urine and flush water, and the other is for air flow and solid waste. With extremely complex structures specially designed for space microgravity in many aspects, the combined toilet is not suitable for the ground. For example, (a) a solid-state receiver uses an ellipsoidal structure, which is complicated to manufacture and high in cost. (b) A lower portion of the center uses a motor-driven thrower mechanism, and a series of blades hinged to one another are used on the thrower to be spread outwards, cut up the solid waste and deposit it into an interlayer, with a complex structure, on the inner wall of the toilet. A rotary disc is hinged to the blades on the thrower, which is complicated to manufacture. In the figures, the hinged blades use needle-knives which are hinged to be like a parallelogram, and use hooked ends which are not conducive to cutting and discharging of viscous solid waste at a low motor ground speed. If the rotary disc having straight edges does not rotate and liquid waste reaches the edge, the liquid waste will flow inwards to a motor shaft.

In an environment-friendly waterless toilet (CN107802200A), a receiver structure of a liquid buffer tank and a solid processing barrel is used, inside which an electric motor rotary cutting and crushing device is mounted. Without an odor eradication device, it is stated in the patent that a non-return valve or one-way valve can effectively prevent flow-back of odor, which can only block odor but cannot eradicate odor. (b) A cavity structure is complicated in shape, with excessive inner and outer sleeves of the same cross section, and excessive cavities (such as cavities 3, 4, 13, 14, 15 and 16), and wall surfaces of the cavities vary in shape from a column, a cone and an irregular curve surface. (c) An outer side of the solid processing barrel is wound in electric heating wires for drying and heating, which has large thermal inertia, a wall of the barrel needs to absorb a large amount of heat first on account of a high heat capacity, solid waste merely is heated through heat conduction, solid waste in contact with the inner wall of the barrel accounts for a small proportion in area after all, and consequently, the heating and drying efficiency of the solid waste is low. (d) A vertical connection plate is arranged between an outer separation barrel and an inner separation disc, which is complicated in structure, difficult to weld and costly. (e) Besides the electric motor cutting device, a costly solid discharge pump is further arranged, and, its inlet and outlet interfaces need certain space and interface design, which further increases complexity and cost. (f) A temperature sensor and a humidity sensor are used to control start and stop of a heating device and a crushing electric motor according to measured temperature and humidity and corresponding preset thresholds, causing complex control, poor reliability, and poor convenience due to the requirement for presetting a threshold again when environmental temperatures change. (g) It is only suitable for seat toilets instead of squat ones. (h) The toilets can only dry and treat waste, and further needs a storage device for solid waste and liquid waste outside. (i) Disassembly and assembly are difficult, and the maintenance cost is high.

A waterless toilet (CN104127151B) uses a urine treatment system, an excreta crushing portion and a drying portion. It has following defects: (a) it consumes plenty of heat and electricity to evaporate liquid in urine and excreta at a high temperature since water accounts for a majority of the urine. (b) Crushing and conveying devices are too complex, difficult to manufacture and high in cost. For example, a crushing chamber includes a crushing cavity, a shaft and an electric motor, and the conveying device includes a conveying cavity, a first worm gear, a second worm gear, a second transmission shaft, a third transmission shaft and a conveying electric motor. (c) An infrared sensor and a data processor are used to sense a distance between a human body and a toilet, which is only suitable for high-grade seat toilets and has high cost. (d) A negative ion sodium hypochlorite generator is used to treat bacteria, requiring regular adding of chemical liquids. On the one hand, waste production is partially on account of chemical addition, and on the other hand, many maintenance steps and high maintenance cost are caused. (e) A driving electric motor and a drying electric motor are used for driving. Since the cost of electric motor accounts for a considerable proportion of manufacturing cost, one more electric motor will increase the cost. (f) Numerous gears and worm gears are arranged, resulting in sharp cost increase due to their machining complexity, high requirements for precision as well as large quantities, for example, a drive gear 15, a rack 17, a second gear 28, a first gear 29, a drying gear 27, a grinding gear 38, an excreta discharging gear 40, a first worm gear 18, a second worm gear 19 a synchronous pulley 22, as well as corresponding shaft and supporting connections.

A device for rapidly decomposing and processing solid waste (CN1974967A) utilizes a method of vacuum and microwave drying processing to process solid waste into sterile odorless dry sheets. Through analysis below, (a) the vacuum method requires an extra vacuum device and a large investment consequently, and a vacuum chamber formed through pumping requires additional processing time which lags behind to a large extent. (b) Too many microwave magnetrons and processing chambers are arranged, for example, a plurality of magnetrons and lamps are arranged in at least three chambers. (c) A large number of pumps and electric motors are arranged as well, for example a solid-liquid separation pump 2, a screw pump 7, a sewage pump 8, a water pump 12, an electric motor 36 and a vacuum pump 22, causing high cost. (d) It is complex in structure, inconvenient in disassembly and assembly, and high in cleaning and maintenance cost.

In a waterless toilet (CN201414748Y), a hot air blower, a dehumidifier and a synchronous heater are used to process pure solid waste. Through analysis below, (a) the utility model is merely provided with a bed pan, but without an outlet and a storage device of liquid waste, which requires a toilet user to defecate instead of urinating since the system cannot dry urine entering the bed pan. (b) Solid waste protruding from the bed pan is scraped by a vertical sheet scraper horizontally moving, which is driven by an additional electric motor, so the structure is complicated and the cost is high. (c) Too many electrical appliances are arranged, for example the hot air blower 8, the dehumidifier 11, an exhaust fan 15, a large exhaust fan 18, a small exhaust fan 19, a heater 12 and an electric scraper 20, which will inevitably lead to high cost. (d) Several interfaces, for example 2-3, are provided between an electric drive air duct and the outside.

SUMMARY

Some embodiments of the present disclosure provide a solid-liquid separation anti-soiling toilet. The toilet is ingenious in structural design and conducive to solid-liquid separation in excreta, eradicates odor by utilizing an aerodynamic heat principle, has good experience for toilet users, is simple in structure, low in cost and high in efficiency, may quickly dry and mold the solid waste, and regularly produce organic fertilizers such as a solid and a liquid, is low in construction or renovation cost, and convenient to clean and maintain, consumes a small quantity of power, and may achieve absolute waterless effect except for a small amount of water required for regular cleaning.

Some embodiments of the present disclosure provide a mounting method of the solid-liquid separation anti-soiling toilet.

Some embodiments of the present disclosure provide a use of the solid-liquid separation anti-soiling toilet.

Some embodiments of the present disclosure are mainly achieved through the following technical solutions:

The solid-liquid separation anti-soiling toilet includes a processor, a liquid reservoir, a solid container and an exhaust device, where the processor is connected to the solid container, the processor includes a housing, and a clamping device and a drying device which are arranged inside the housing, excreta generated after use of the toilet by a user enters the clamping device of the processor, a liquid in the excreta enters the liquid reservoir after passing through the clamping device, a solid in the excreta is pressed and dried into a sheet inside the clamping device, and enters the solid container, hot air flow generated by the drying device is used for drying a solid inside the clamping device, and is exhausted outwards through the exhaust device connected to the housing of the processor, and the clamping device is configured for pressing the solid.

In some embodiments, the clamping device includes a rotary mechanism and a fixed mechanism, the rotary mechanism rotating to get close to the fixed mechanism and cooperating with the fixed mechanism to press the solid in the excreta.

In some embodiments, the fixed mechanism includes a fixed plate and a cavity plate, wherein the fixed plate is connected to the cavity plate and fixed inside the processor, and a cavity structure is formed between the fixed plate and the cavity plate; and the rotary mechanism includes a rotary plate and a rotary shaft, and the rotary plate rotates around the rotary shaft to cooperate with the fixed plate to press the solid.

In some embodiments, the clamping device further includes a cover plate, wherein the cover plate is connected to the rotary plate, and when the rotary plate cooperates with the fixed plate to press the, the cover plate rotates to an opening of the processor to seal the processor.

In some embodiments, the cover plate is in a planar structure or a cambered structure, and a reinforcing rod is arranged between an inner wall surface of the cover plate and the rotary plate.

In some embodiments, the clamping device further includes a push device for pushing a dried and pressed sheet into the solid container, the push device including a spring rod, a push handle and a push end, where two ends of the spring rod are separately connected with the push handle and the push end, a return spring is arranged on the spring rod, and after pushing action is completed, the push handle is automatically restored to an original position under an action of the return spring.

In some embodiments, the clamping device further includes a rotary handle, the rotary handle being arranged at one end of the rotary plate 1.

In some embodiments, the rotary plate is in contact with a bottom of the fixed plate when the solid is not treated by the clamping device, a structure with a V-shaped cross section is formed.

In some embodiments, the drying device includes an air supply device and a heating device, the heating device being arranged on a surface, which is not used for solid pressing, of the rotary plate and/or the fixed plate, and the heating device arranged on the surface of the fixed plate being located in the cavity structure formed between the fixed plate and the cavity plate; and the cavity plate is provided with a first through hole near a bottom, and the air supply device is in communication with the first through hole to supply generated air flow to an inside of the cavity structure.

In some embodiments, the fixed plate is provided with a second through hole near a top, and an air flow inside the cavity structure enters, through the second through hole, a space formed between the rotary plate and the fixed plate.

In some embodiments, a bottom of the rotary plate and a bottom of a fixed plate are both provided with liquid discharging holes for discharging the liquid in the excreta.

In some embodiments, the liquid discharging holes include large liquid discharging holes and small liquid discharging holes, the small liquid discharging holes are arranged in sequence, the two large liquid discharging holes are separately located at two ends of first and last small liquid discharging holes arranged in sequence, each of the large liquid discharging holes has a diameter of 5-15 mm, and each of the small liquid discharging holes has a diameter of 3-6 mm.

In some embodiments, the cavity plate is connected and fixed to the housing of the processor through at least one cavity plate fixing plate.

In some embodiments, a receptacle and a liquid drain pipe are further arranged in the processor, the receptacle is arranged below a liquid discharging hole at a bottom of the clamping device, and is used for receiving the liquid in the excreta and transferring the liquid into the liquid reservoir through the liquid drain pipe, and the liquid drain pipe includes a U-shaped structural section.

In some embodiments, the exhaust device includes an induced draft fan and an exhaust pipe, toilet paper matching an interior of the clamping device in shape is put into the clamping device before use to prevent soiling.

In some embodiments, after rotating to a stop point, the rotary plate forms a parallel structure with the fixed plate, and after the rotary plate rotates to the stop point, the drying device is started.

In some embodiments, the housing of the processor is connected with the solid container through a limit stop, and the limit stop is an elongated plate bent to match an outer wall surface of the housing of the processor in shape, is fixed on the outer wall surface of the housing of the processor and extends out of an outer edge of a bottom of the processor.

The solid-liquid separation anti-soiling toilet further includes an appliance which is connected with the processor for use of the toilet by a user, the appliance including a squat appliance or a seat appliance.

In some embodiments, both the solid container and the liquid reservoir are in transparent cavity structures.

The mounting method of the solid-liquid separation anti-soiling toilet includes:
  connecting and fixing the processor to the solid container through a limit stop; and
  making a receptacle in the processor be in communication with the liquid reservoir through a liquid drain pipe.

The application of the solid-liquid separation anti-soiling toilet in rural and remote areas, space, cities, parks or scenic spots is further provided.

Compared with an art known to inventors, some embodiments of the present disclosure have the following beneficial effects:

(1) The solid-liquid separation anti-soiling toilet provided by some embodiments of the present disclosure is composed of the processor, the solid container, the liquid reservoir and the exhaust device. The toilet is ingenious in structural design and conducive to solid-liquid separation in the excreta, eradicates the odor by utilizing an aerodynamic heat principle. The toilet has good experience for toilet users, is simple in structure, low in cost and high in efficiency, may quickly dry and mold the solid waste, and regularly produce organic fertilizers such as the solid and the liquid, is low in construction or renovation cost, and convenient to clean and maintain, consumes a small quantity of power, and may achieve absolute waterless effect except for a small amount of water required for regular cleaning.

(2) In a processor of the toilet of some embodiments of the present disclosure, the clamping device is used to realize solid-liquid separation in the excreta, the solid in the excreta is pressed inside the clamping device, and the solid is dried by the drying device to directly generate solid waste, which is novel in structure, unique in design, simple in structure, low in cost and convenient to apply and popularize.

(3) The clamping device in the processor of some embodiments of the present disclosure includes the rotary mechanism and the fixed mechanism. The fixed mechanism is designed in a cavity structure, which is in communication with the air supply device and cooperates with the heating device to generate the hot air flow, so as to dry the solid inside the clamping device. The structural design is ingenious, and in some embodiments, the clamping device is designed in the V-shaped groove structure, which is conducive to solid-liquid separation and solid pressing. The toilet has an overall structure saving space, is small in volume and has high efficiency.

(4) The clamping device of some embodiments of the present disclosure uses single-plate or double-plate heating, and limits the solid in a small space of the interlayer for being heated and dried, which has high heating and drying efficiency. According to some embodiments of the present disclosure, the large and small liquid discharging holes with different sizes are designed at the bottom of the interlayer device, such that discharging of a large amount of liquid is facilitated when the toilet is used in the posture of standing or squatting or sitting, and a solid-liquid separation effect is good.

(5) In some embodiments of the present disclosure, the exhaust device is mounted on the side wall of the processor housing, and an air duct of an air exhaust outlet is connected with a side wall of the housing of the processor, such that a geometric space is simpler, an occupied volume is smaller and compactness is higher.

(6) Connection structures between the processor, the solid container and the liquid reservoir of some embodiments of the present disclosure are simple, convenient to mount and easy to disassemble, and meanwhile, in some embodiments, the solid container and the liquid reservoir are designed in the transparent structures, which makes observation much easier and facilitates production of cake-like organic solid fertilizers and liquid fertilizers regularly.

(7) Some embodiments of the present disclosure truly realizes the waterless toilet, except for a small amount of water required for regular cleaning and surface cleaning for a long time, and no more water is needed during normal use of the toilet. Some embodiments of the present disclosure consume a small quantity of power, which is produced by the clamping device and the drying device, thereby saving energy and reducing the cost.

(8) The toilet of some embodiments of the present disclosure may be designed and constructed under the ground, and may also be designed by building a supporting and taking and place-in space structure on the ground, achieving low construction or reconstruction costs and convenience in maintenance and popularization. In addition, the toilet in some embodiments of the present disclosure has a wide application range, including rural areas and remote areas, space, the cities, the parks and the scenic spots, and may be connected externally to squatting appliances, seating appliances, etc. for use.

BRIEF DESCRIPTION OF THE DRAWINGS

FIG. 3 are structural schematic diagrams of a rotary mechanism in a clamping device of the present disclosure, where

FIG. 4 are structural schematic diagrams of a fixed mechanism in the clamping device of the present disclosure, where

FIG. 5 is schematic diagrams showing connections of a rotary plate and a fixed plate in the clamping device to a heating device of the present disclosure, where FIG. 6 is a structural schematic diagram of a receptacle of the present disclosure, where

DETAILED DESCRIPTION OF THE EMBODIMENTS

Figure 1:
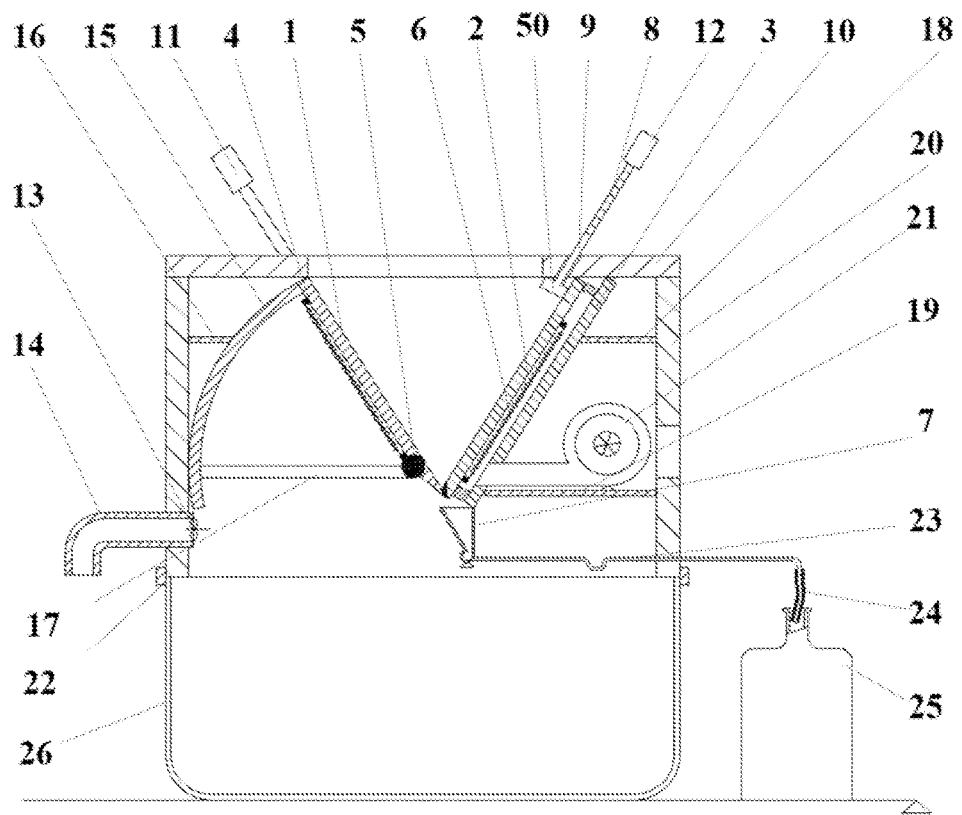
FIG. 1 is a structural schematic diagram of a solid-liquid separation anti-soiling toilet of the present disclosure.
Figure 2:
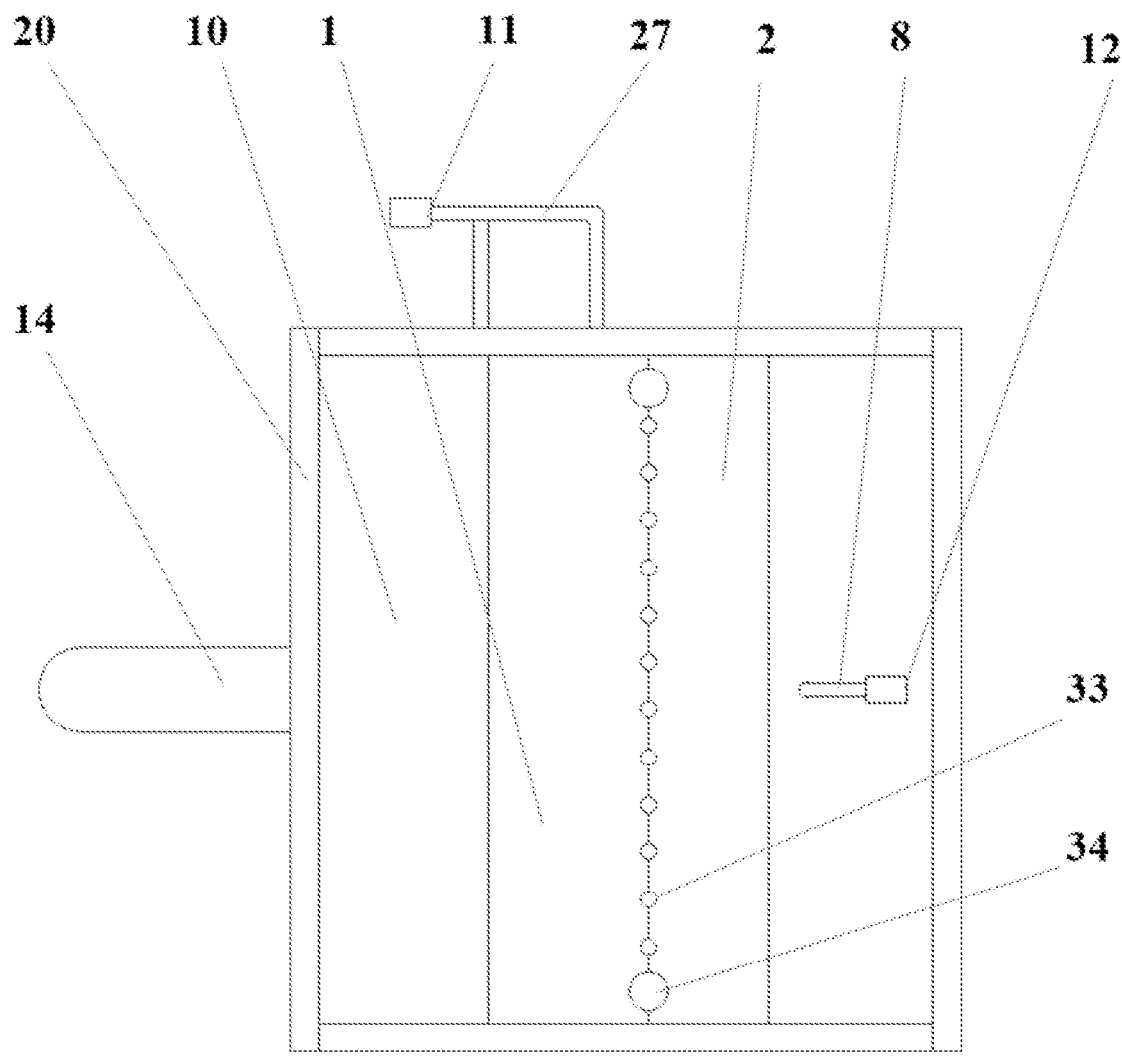
FIG. 2 is a top view of the solid-liquid separation anti-soiling toilet of the present disclosure.

The following further describes the present disclosure in detail with reference to accompanying drawings and in conjunction with particular embodiments:

FIG. 1 is a structural schematic diagram of a solid-liquid separation anti-soiling toilet of some embodiments of the present disclosure, and FIG. 2 is a top view of the solid-liquid separation anti-soiling toilet of some embodiments of the present disclosure. The solid-liquid separation anti-soiling toilet of some embodiments of the present disclosure includes a processor, a liquid reservoir 25, a solid container 26 and an exhaust device, where the processor is connected with the solid container 26, the processor includes a housing, and a clamping device and a drying device which are arranged inside the housing, the housing includes an upper housing plate 10 and a side housing plate 20. Each component may be designed under the ground or on the ground. For example, a supporting and taking and put-in space structure may be built on the ground, in which the processor is fixed relative to the ground, and the solid container 26 and the liquid reservoir 25 are movable, so as to be convenient in collection, taking-out and re-putting-in. The solid-liquid separation anti-soiling toilet of some embodiments of is a squat device, and may also include a seat appliance which is connected with the processor and for using the toilet by a user.

Figure 3A:
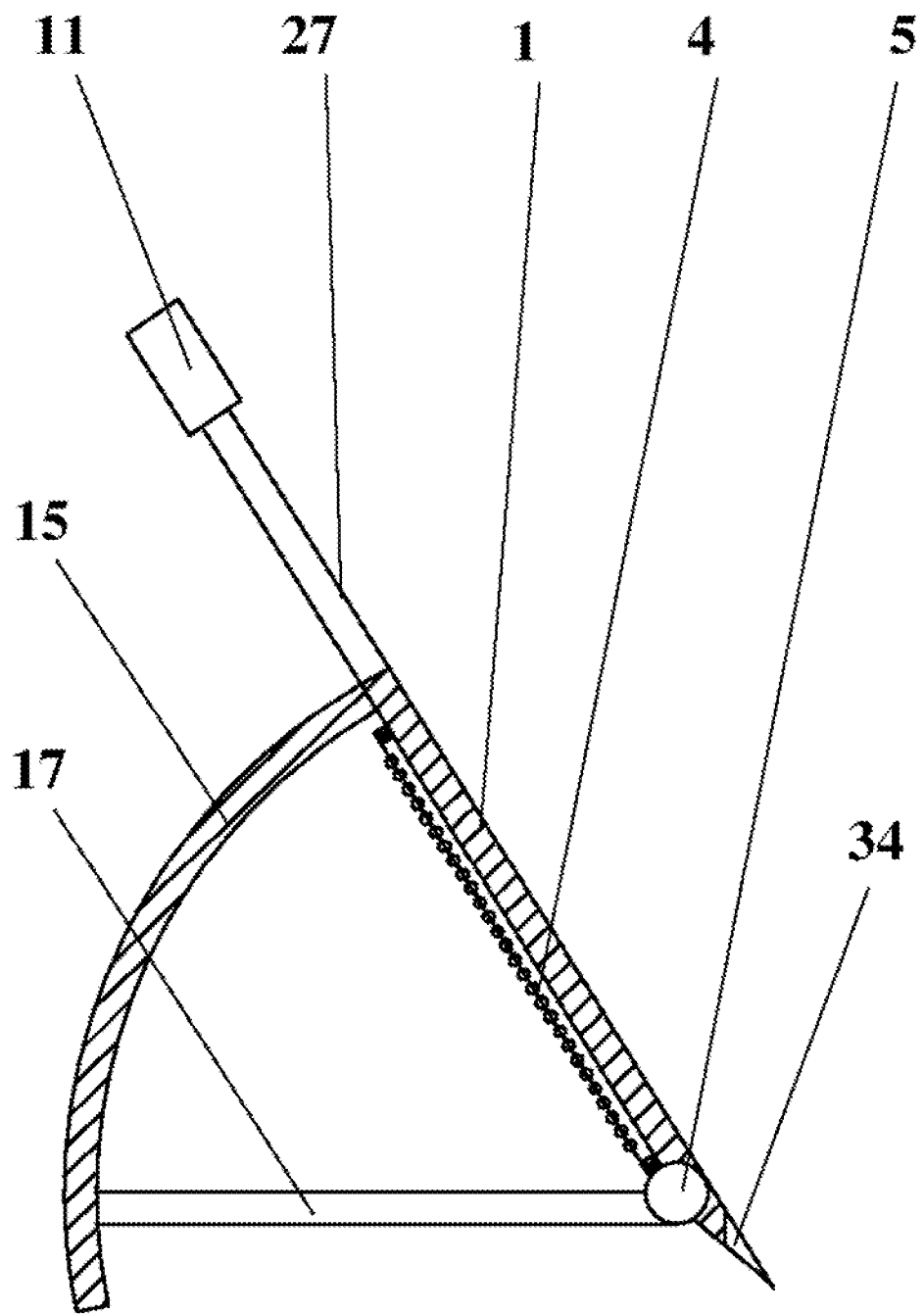
FIG. 3a is a front view.
Figure 3B:
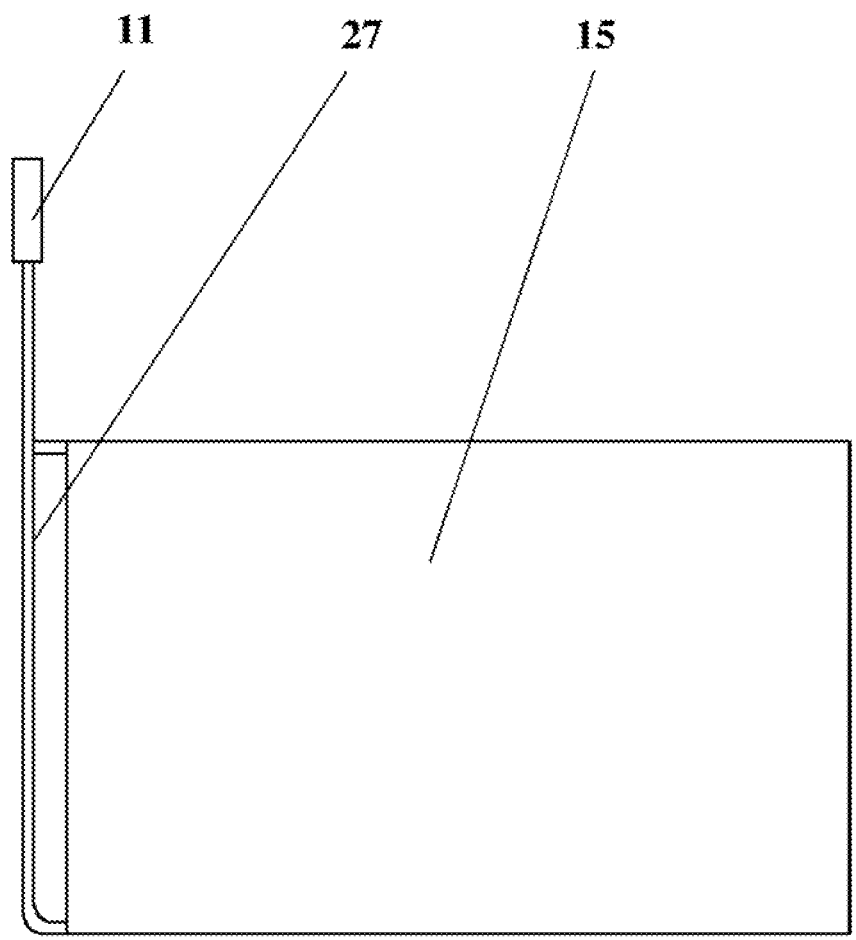
FIG. 3b is a side view.
Figure 3C:
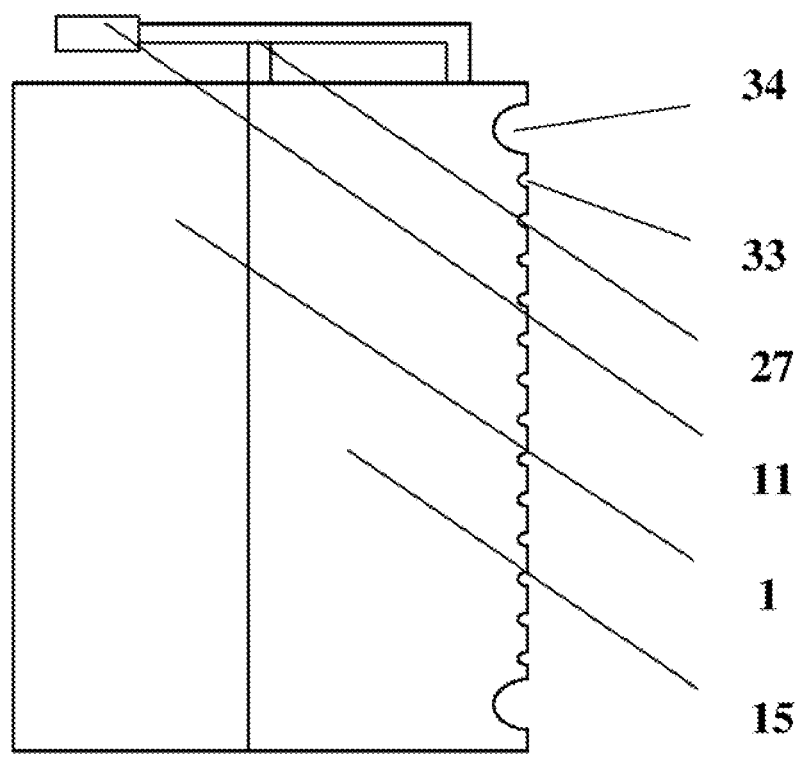
FIG. 3c is a top view.

As shown in FIG. 1, the clamping device of some embodiments of the present disclosure includes a rotary mechanism and a fixed mechanism, the rotary mechanism rotating to get close to the fixed mechanism and cooperating with the fixed mechanism to press a solid in excreta. FIG. 3 is structural schematic diagrams of a rotary mechanism in a clamping device of some embodiments of the present disclosure, where FIG. 3a is a front view, FIG. 3b is a side view, and FIG. 3c is a top view. The rotary mechanism includes a rotary plate 1, a rotary shaft 5, a cover plate 15, a rotary handle 11, a reinforcing rod 17 and a cylinder shaft handle fixed rod 27. The rotary shaft 5 is arranged on a position, near a bottom, of the rotary plate 1, and the rotary plate 1 rotates around the rotary shaft 5 to press the solid in cooperation with a fixed plate 2 of the fixed mechanism. The rotary handle 11 is connected with an end of the rotary plate 1 through the cylinder shaft handle fixed rod 27, so as to drive the rotary plate 1 to rotate. The cover plate 15 is connected with the rotary plate 1, the cover plate 15 is in a planar structure or a cambered structure, and a reinforcing rod 17 is arranged between an inner wall surface of the planar structure or the cambered structure and the rotary plate 1. In an embodiment of the present disclosure, the cover plate 15 is selectively in a ¼ wall structure (a cylindrical structure). When the rotary plate 1 cooperates with the fixed plate 2 to press the solid, the cover plate 15 rotates to an opening of the processor to seal the processor and prevent odor from being diffused outwards. As shown in FIG. 1, an outer wall surface of the cover plate 15 is further provided with a cylinder wall stop 16 to limit the cover plate 15 in an open state.

As shown in FIG. 3c, discharging holes (liquid discharging semi-holes) are provided at a bottom of the rotary plate 1 for discharging a liquid in the excreta. The liquid discharging holes include a large liquid discharging hole 34 and a small liquid discharging hole 33 (a liquid discharging semi-hole). As shown in FIG. 2, in an embodiment of the present disclosure, there are a plurality of liquid discharging holes 33, the plurality of liquid discharging holes 33 are arranged in sequence, and the two large liquid discharging holes are located at two ends of the first and last small liquid discharging holes 33 arranged in sequence. In some embodiments, the large liquid discharging hole 34 has a diameter of 5-15 mm, and the small liquid discharging hole 33 has a diameter of 3-6 mm. It should be noted that in some embodiments of the present disclosure, the rotary plate 1 is provided with the liquid discharging semi-holes, which are combined with liquid discharging semi-holes provided on the fixed plate 2 to form the liquid discharging holes as shown in FIG. 2, including the large liquid discharging hole 34 and the small liquid discharging hole 33.

Figure 4A:
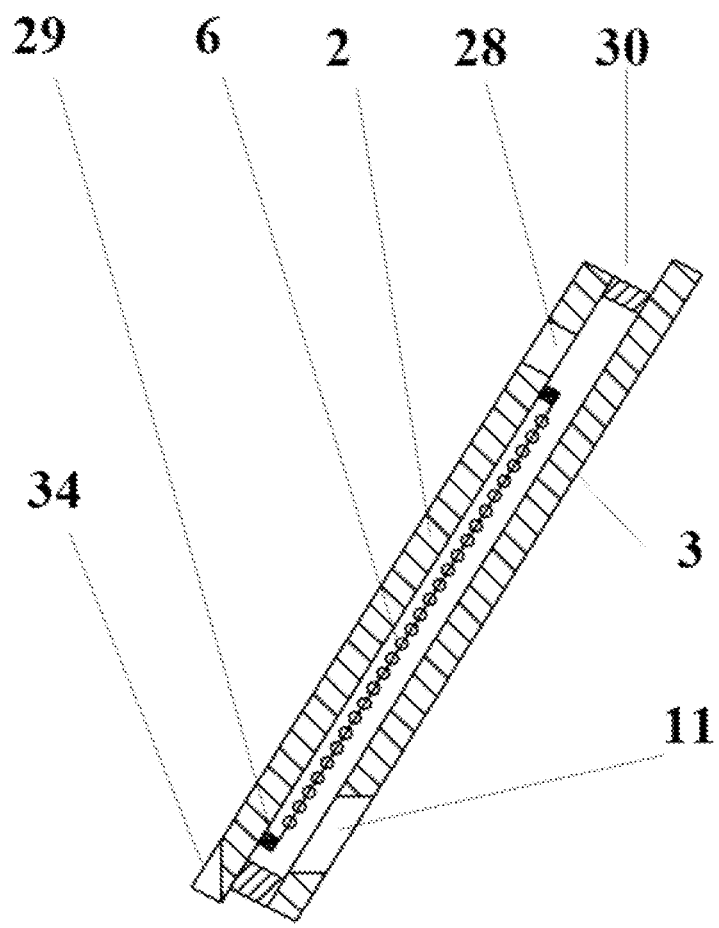
FIG. 4a is a front view.
Figure 4B:
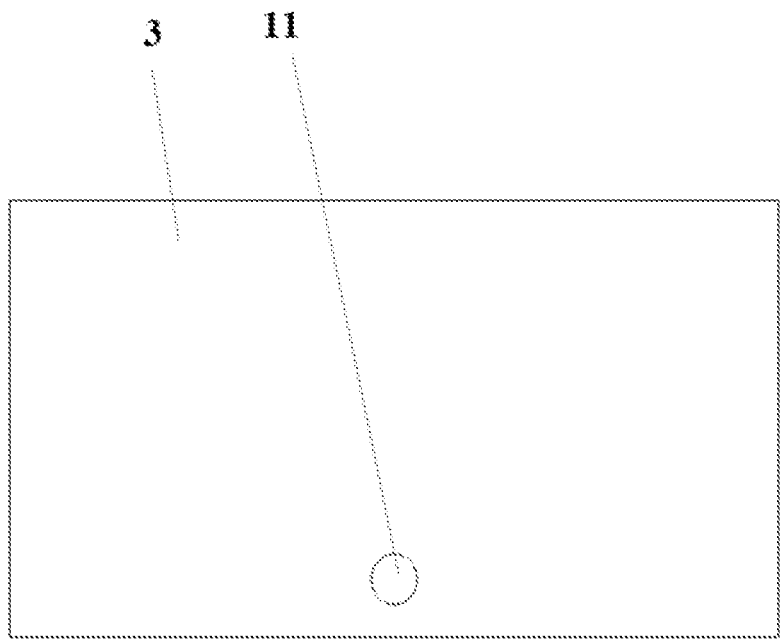
FIG. 4b is a right side view.
Figure 4C:
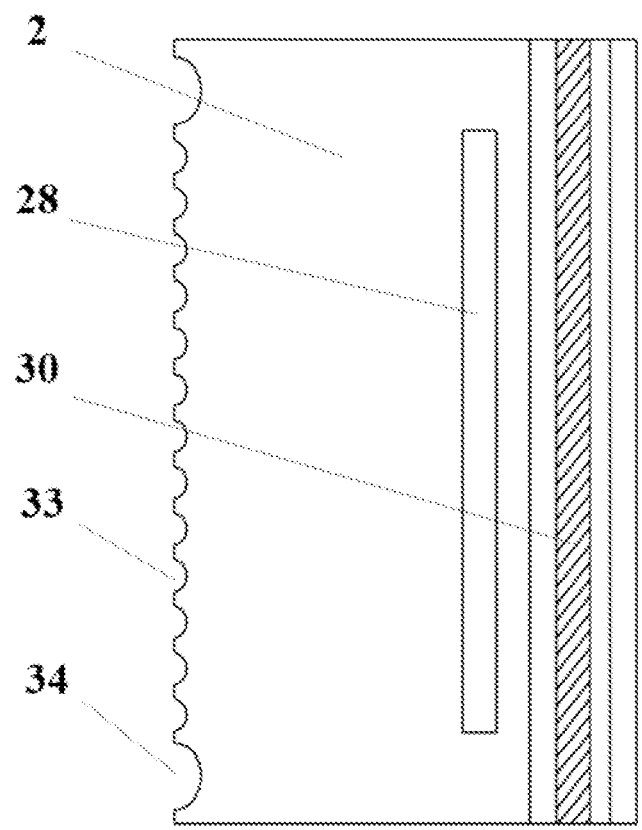
FIG. 4c is a top view.

FIG. 4 are structural schematic diagrams of a fixed mechanism in the clamping device of some embodiments of the present disclosure, where FIG. 4a is a front view, FIG. 4b is a right side view, and FIG. 4c is a top view. The fixed mechanism includes a fixed plate 2 and a cavity plate 3. The cavity plate 3 is connected with the fixed plate 2 through cavity seals 30 arranged at both ends to form an internal cavity structure, and the cavity structure is fixed inside the processor, as shown in FIG. 4c. The holes which are provided at a bottom of the fixed plate 2 and match the liquid discharging semi-holes provided on the rotary plate 1 are also the liquid discharging semi-holes, which are combined with the liquid discharging semi-holes provided on the rotary plate 1 to form the liquid discharging holes as shown in FIG. 2, including the large liquid discharging hole 34 and the small liquid discharging hole 33.

Figure 5A:
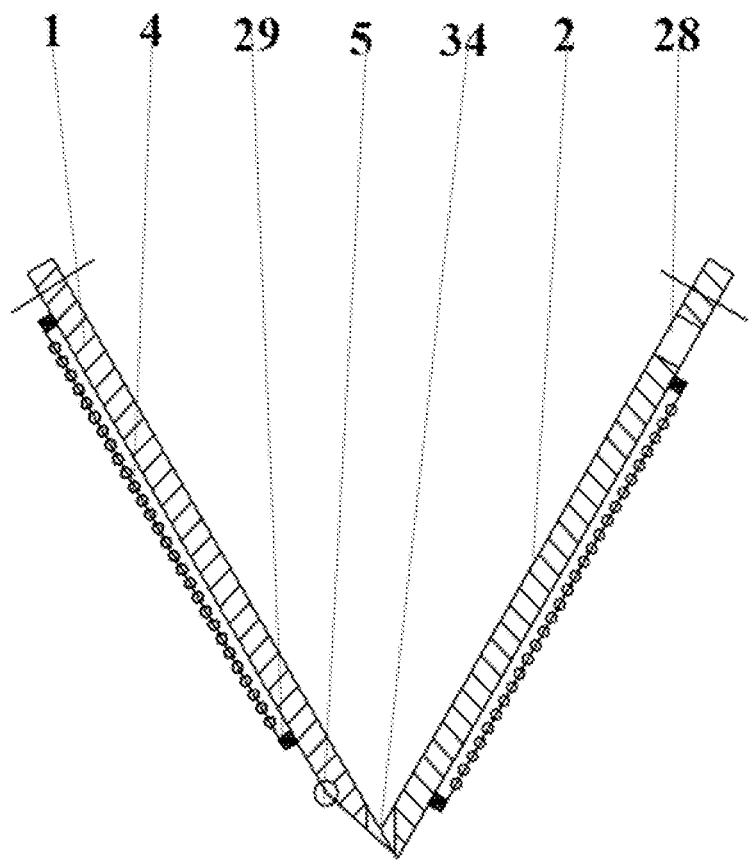
FIG. 5a is a front view.
Figure 5B:
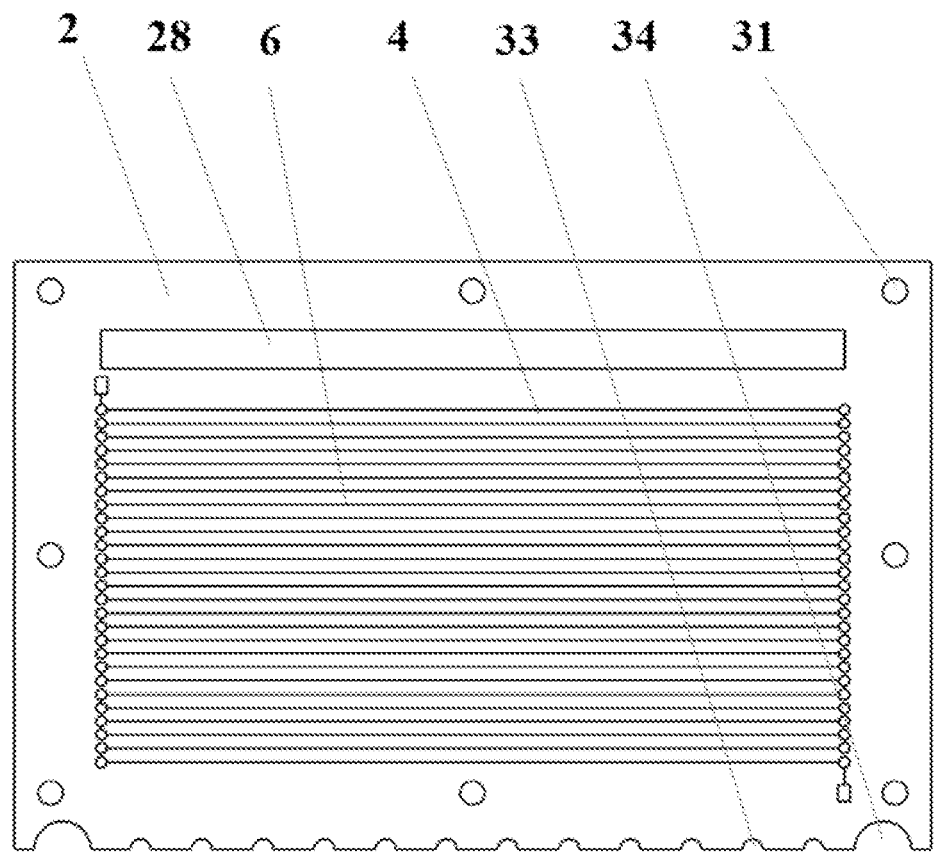
FIG. 5b is a right side view and FIG. 5c is a left side view.
Figure 5C:
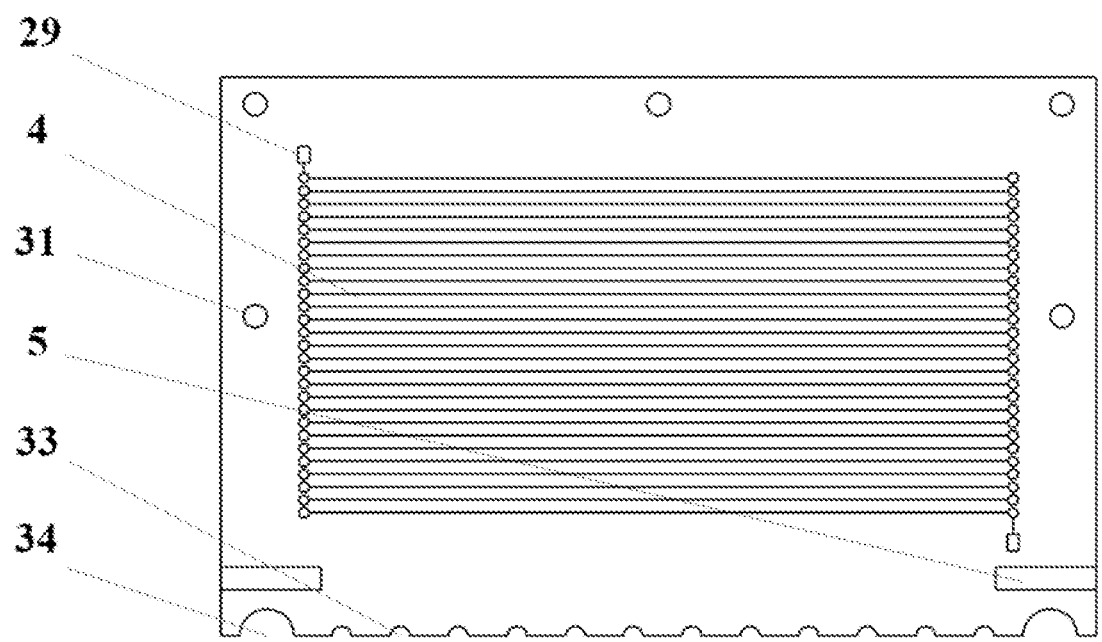

FIG. 5 is schematic diagrams showing connections of a rotary plate and a fixed plate in the clamping device to a heating device of some embodiments of the present disclosure, where FIG. 5a is a front view, FIG. 5b is a right side view and FIG. 5c is a left side view. The drying device includes an air supply device 21 and a heating device 4, the heating device 4 is arranged on an outer surface of the rotary plate 1 and/or the fixed plate 2, that is, on a surface which is not used for solid pressing. In some embodiments, the heating device 4 is arranged on a surface of the rotary plate 1 or the fixed plate 2, or is arranged on both surfaces of the rotary plate 1 and the fixed plate 2 at the same time. In some embodiments, the heating device 4 may use a heater band or a heater strip, etc., including an electric heating end 29. The heating device 4 arranged on the surface of the fixed plate 2 is located in the cavity structure formed between the fixed plate 2 and the cavity plate 3, as shown in FIG. 5, the reference numeral 31 indicates a flange hole, the rotary plate 1 is in contact with the bottom of the fixed plate 2 when the solid is not treated by the clamping device, so as to form a structure with a V-shaped cross section, and the rotary plate 1 on a side of the V-shaped tank structure rotates around the rotary shaft, so as to realize spaces with different thickness.

The cavity plate 3 is provided with a first through hole near a bottom, and the air supply device 21 is in communication with the first through hole to supply generated air flow to an inside of the cavity structure, and the air flow is heated by the heating device 4 to produce a hot air flow. The fixed plate 2 is provided with a second through hole 28 near a top, and the hot air flow inside the cavity structure enters, through the second through hole 28, a space formed between the rotary plate 1 and the fixed plate 2, so as to dry a solid to be pressed. The second through hole 28 may be set randomly in shape. As shown in FIG. 4c, in some embodiments of the present disclosure, the second through hole 28 is designed as an elongated rectangular hole, facilitating outflow of the hot air flow. The V-shaped tank forms a rectangular space by pressing the solid. After drying the solid, the hot air flow is discharged from the liquid discharging hole at the bottom of the clamping device into the housing of the processor, and then discharged outwards by the exhaust device.

As shown in FIG. 1, the cavity plate 3 is connected and fixed to the housing of the processor by two cavity plate fixing plates 18 and 19. The air supply device 21 is mounted on the cavity plate fixing plate 19. An air outlet of the air supply device 21 is in communication with the first through hole provided at a bottom of the cavity plate 3.

As shown in FIGS. 1 and 2, the clamping device further includes a push device for pushing the dried and pressed sheet into the solid container 26, the push device includes a spring rod 8, a push handle 12 and a push end 50, where two ends of the spring rod 8 are separately connected with the push handle 12 and the push end 50, a return spring is arranged on the spring rod, and after pushing action is completed, the push handle 12 is automatically restored to an original position under an action of the return spring.

Figure 6A:
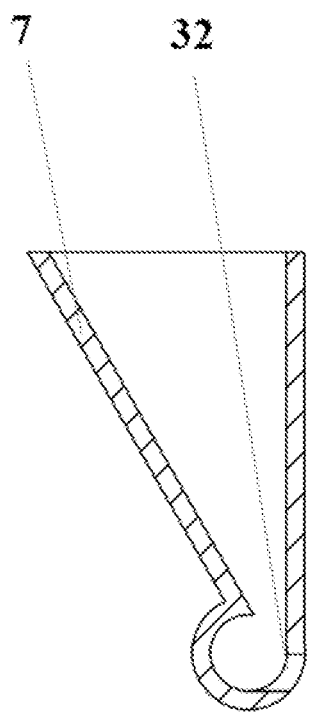
FIG. 6a is a front view and FIG. 6b is a right side view.
Figure 6B:
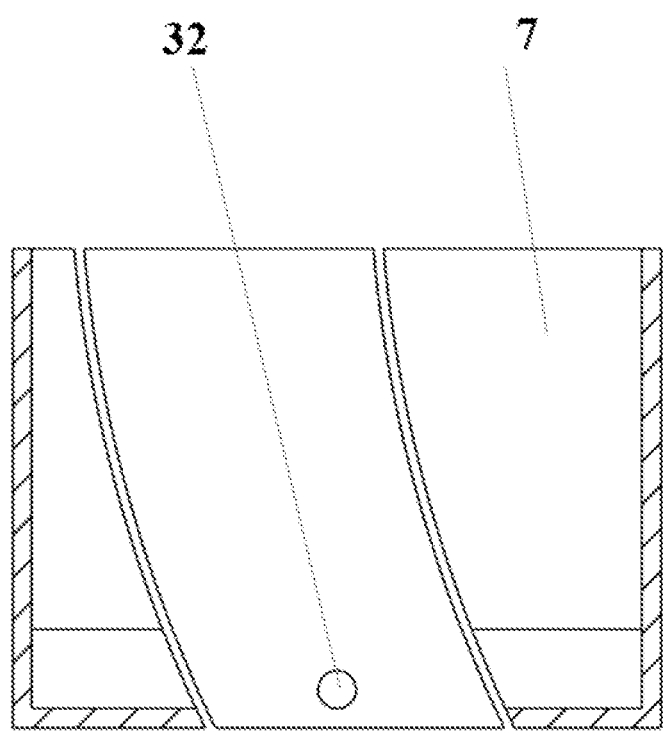

A receptacle and a liquid drain pipe 23 are further arranged in the processor, the receptacle is arranged below the liquid discharging hole at the bottom of the rotary plate 1 and at the bottom of the fixed plate 2, and is used for receiving the liquid in the excreta and transferring the liquid into the liquid reservoir 25 through the liquid drain pipe 23. FIG. 6 is a structural schematic diagram of a receptacle of some embodiments of the present disclosure, where FIG. 6a is a front view and FIG. 6b is a right side view. In an embodiment of the present disclosure, the receptacle has an inverted R-shape, the receptacle includes a receiving tank 7 and a liquid drain pipe interface 32. One side wall of the receiving tank 7 is designed in a slope to facilitate receiving of the liquid in excreta, and the receiving tank 7 may partially contain a lower tip of the V-shaped tank, avoiding a sliding space of the pressed and dried sheet. The liquid drain pipe interface 32 at a bottom of the receiving tank 7 is designed in a spherical shape, facilitating drainage of the liquid into the liquid reservoir 25 through the liquid drain pipe 23. A U-shaped structure is arranged in a middle of the liquid drain pipe 23, which plays a role in preventing air flow. An end of the liquid drain pipe 23 is in communication with the liquid reservoir 4 through a hose 24, so as to drain the liquid into the liquid reservoir 25.

The exhaust device in some embodiments of the present disclosure includes an induced draft fan 13 and an exhaust pipe 14, which is in communication with a side wall of the housing of the processor, so as to exhaust the hot air flow inside the processor outwards. After rotating to a stop point, the rotary plate 1 forms a parallel structure with the fixed plate 2, and after the rotary plate 1 rotates to the stop point, the drying device is started. In some embodiments of the present disclosure, the housing of the processor is connected with the solid container 26 by a limit stop 22, and the limit stop 22 is an elongated plate, the elongated plate bents to match an outer wall surface of the housing of the processor in shape, the limit stop 22 is fixed on the outer wall surface of the housing of the processor and extends out of an outer edge of a bottom of the processor. The limit stop may be designed in, for example a U shape.

In some embodiments of the present disclosure, both the solid container 26 and the liquid reservoir 25 are in transparent cavity structures, which are easy to observe and are conducive to control of maintenance time.

When the toilet of the present disclosure is used, a V-shaped toilet paper which is slow in water absorption is used every time to prevent soiling, and a wiping toilet paper is received at the same time, both of which are pressed and dried at the same time, and odor is well controlled. In some embodiments of the present disclosure, fastening edges are provided on top panels at both sides of the V-shaped tank structure, so as to further prevent odor diffusion. For example, a fastening edge is provided at an end of the cover plate 15. When the rotary plate 1 matches the fixed plate 2, the fastening edge on the cover plate 15 and a top of the fixed plate 2 are mutually fastened and overlapped.

The solid-liquid separation and solid waste dehydration anti-soiling waterless toilet of some embodiments of the present disclosure is designed into the V-shaped tank structure, a bottom of the V-shaped tank may simultaneously or separately receive solid excreta and liquid excreta, a received liquid directly enters a receiving tank through the large holes and the small holes at the bottom of the V-shaped tank, and enters the liquid reservoir through the liquid drain pipe, and by rotating the handle to the stop point, the solid waste is pressed into the sheet by rotating the rotary plate at one side of the V-shaped tank, semi-closure of the space is realized, in addition, a double-sided heater, a blower and the exhaust device are triggered and started, the sheet is heated and dried, after dehydration of the sheet, the push handle is pushed to push the solid sheet into the solid container, and the rotary handle is restored to complete one cycle. As shown in FIG. 2, in order to facilitate use of the toilet of some embodiments of the present disclosure, space arrangement of the rotary handle and the push handle in the clamping device avoids influence of use space of a toilet user.

The mounting method of the solid-liquid separation anti-soiling toilet of some embodiments of the present disclosure includes:

Firstly, according to a geographical environment, whether the toilet is indoor or outdoor (such as renovation of a latrine pit) is determined, and whether to use a squat or seat toilet is determined. If the squat toilet is selected, an upper portion of a V-shaped opening is coupled with a foot plane. If the seat toilet is selected, an upper portion needs to be coupled with one similar to a conventional seat toilet. Whether the toilet is mounted on the ground or under the ground is determined, and after locations and quantities of infrastructure and other toilet fittings are determined and foundation works of positioning facilities are completed, the following operation steps of the present disclosure proceed.

(1) Components of a rotary mechanism and a fixed mechanism of a clamping device in a processor are connected.

(2) A solid container is pushed to a U-shaped limit stop below the processor.

(3) A hose at an end of a liquid drain pipe is extended into a liquid reservoir.

(4) V-shaped paper with a proper size is put into a V-shaped tank, and after the toilet is used by a user, the rotary mechanism and the fixed mechanism are started, and after the rotary mechanism and the fixed mechanism are restored, one cycle is completed.

(5) When the solid container and the liquid reservoir is full at the same time or at different time, the solid container and the liquid reservoir may be removed and replaced simultaneously or separately, which is very convenient.

(6) During regular maintenance, only a small amount of water is needed to clean the V-shaped tank.

According to a control mode of some embodiments of the present disclosure, only a rotary handle in the rotary mechanism needs to be closed, linking with an electric switch and a time relay may be achieved, delay control over the electric switch is achieved, and then a push handle and the rotary handle are pressed once again to be restored, such that waste processing and receiving are completed, which is very convenient. After a certain period of time, a necessary and simple maintenance link proceeds. A specific method includes:

(1) When the toilet is not used, a rotary plate 1 is at an initial position, the V-shaped tank of the clamping device is opened, all electric appliances are closed, and a small quantity of odor in an inner corner of the toilet are isolated.

(2) After the toilet is used, excreta enters a bottom of the clamping device, and a liquid enters the receptacle through a liquid discharging hole at the bottom of the clamping device, and enters the liquid reservoir through a liquid drain pipe. The handle of the rotary mechanism is rotated, a drying device is started, such that the rotary mechanism cooperates with the fixed mechanism to press and dry the solid in the excreta to obtain a solid sheet, and the solid sheet is pushed into the solid container by pushing the push handle.

(3) When the toilet is used again, the operation of step (2) is repeated.

(4) After a certain period of time, the solid container and the liquid reservoir are emptied at the same time or at different time, the maintenance link proceeds if necessary, and the processor is separated from the solid container for internal cleaning and then mounting. The exhaust device arranged at a bottom of the processor realizes better odorless body feeling.

The solid-liquid separation anti-soiling toilet of some embodiments of the present disclosure may be used to rural and remote areas, space, cities, parks, scenic spots, etc.

What is described above is merely the optimal particular embodiment of the present disclosure, but a protection scope of the present disclosure is not limited thereto. Any change or substitution that may be easily conceived by any technician familiar with the technical field within the technical scope disclosed by the present disclosure should be covered within the protection scope of the present disclosure.

What is not described in detail in the specification of the present disclosure belongs to the prior art of professional technicians in the field.

What is claimed is:

1. A solid-liquid separation anti-soiling toilet, comprising a processor, a liquid reservoir, a solid container and an exhaust device, wherein the processor is connected to the solid container, the processor comprises a housing, and a clamping device and a drying device which are arranged inside the housing, excreta generated after use of the toilet by a user enters the clamping device of the processor, a liquid in the excreta enters the liquid reservoir after passing through the clamping device, a solid in the excreta is pressed and dried into a sheet inside the clamping device, and enters the solid container, hot air flow generated by the drying device is used for drying a solid inside the clamping device, and is exhausted outwards through the exhaust device connected to the housing of the processor, and the clamping device is configured for pressing the solid; wherein the clamping device comprises a rotary mechanism and a fixed mechanism, the rotary mechanism rotating to get close to the fixed mechanism and cooperating with the fixed mechanism to press the solid in the excreta;

wherein the clamping device further comprises a push device for pushing a dried and pressed sheet into the solid container, the push device comprising a spring rod, a push handle and a push end, wherein two ends of the spring rod are separately connected with the push handle and the push end, a return spring is arranged on the spring rod, and after pushing action is completed, the push handle is automatically restored to an original position under an action of the return spring.

2. The solid-liquid separation anti-soiling toilet as claimed in claim 1, wherein the fixed mechanism comprises a fixed plate and a cavity plate, wherein the fixed plate is connected to the cavity plate and fixed inside the processor, and a cavity structure is formed between the fixed plate and the cavity plate; and the rotary mechanism comprises a rotary plate and a rotary shaft, and the rotary plate rotates around the rotary shaft to cooperate with the fixed plate to press the solid.

3. The solid-liquid separation anti-soiling toilet as claimed in claim 2, wherein the clamping device further comprises a cover plate, wherein the cover plate is connected to the rotary plate, and when the rotary plate cooperates with the fixed plate to press the solid, the cover plate rotates to an opening of the processor to seal the processor.

4. The solid-liquid separation anti-soiling toilet as claimed in claim 3, wherein the cover plate is in a planar structure or a cambered structure, and a reinforcing rod is arranged between an inner wall surface of the cover plate and the rotary plate.

5. The solid-liquid separation anti-soiling toilet as claimed in claim 3, wherein the clamping device further comprises a rotary handle, the rotary handle being arranged at an end of the rotary plate.

6. The solid-liquid separation anti-soiling toilet as claimed in claim 2, wherein the rotary plate is in contact with a bottom of the fixed plate when the solid is not treated by the clamping device, a structure with a V-shaped cross section is formed.

7. The solid-liquid separation anti-soiling toilet as claimed in claim 2, wherein the drying device comprises an air supply device and a heating device, the heating device being arranged on a surface, which is not used for solid pressing, of the rotary plate and/or the fixed plate, and the heating device arranged on the surface of the fixed plate being located in the cavity structure formed between the fixed plate and the cavity plate; and the cavity plate is provided with a first through hole near a bottom, and the air supply device is in communication with the first through hole to supply generated air flow to an inside of the cavity structure.

8. The solid-liquid separation anti-soiling toilet as claimed in claim 7, wherein the fixed plate is provided with a second through hole near a top, and an air flow inside the cavity structure enters, through the second through hole, a space formed between the rotary plate and the fixed plate.

9. The solid-liquid separation anti-soiling toilet as claimed in claim 2, wherein a bottom of the rotary plate and a bottom of a fixed plate are both provided with liquid discharging holes for discharging the liquid in the excreta.

10. The solid-liquid separation anti-soiling toilet as claimed in claim 9, wherein the liquid discharging holes comprise large liquid discharging holes and small liquid discharging holes, the small liquid discharging holes are arranged in sequence, the two large liquid discharging holes are separately located at two ends of first and last small liquid discharging holes arranged in sequence, each of the large liquid discharging holes has a diameter of 5-15 mm, and each of the small liquid discharging holes has a diameter of 3-6 mm.

11. The solid-liquid separation anti-soiling toilet as claimed in claim 2, wherein the cavity plate is connected and fixed to the housing of the processor through at least one cavity plate fixing plate.

12. The solid-liquid separation anti-soiling toilet as claimed in claim 2, wherein after rotating to a stop point, the rotary plate forms a parallel structure with the fixed plate, and after the rotary plate rotates to the stop point, the drying device is started.

13. The solid-liquid separation anti-soiling toilet as claimed in claim 1, wherein a receptacle and a liquid drain pipe are further arranged in the processor, the receptacle is arranged below a liquid discharging hole at a bottom of the clamping device, and is used for receiving the liquid in the excreta and transferring the liquid into the liquid reservoir through the liquid drain pipe, and the liquid drain pipe comprises a U-shaped structural section.

14. The solid-liquid separation anti-soiling toilet as claimed in claim 1, wherein the exhaust device comprises an induced draft fan and an exhaust pipe, toilet paper matching an interior of the clamping device in shape is put into the clamping device before use to prevent soiling.

15. The solid-liquid separation anti-soiling toilet as claimed in claim 1, wherein the housing of the processor is connected with the solid container through a limit stop, and the limit stop is an elongated plate bent to match an outer wall surface of the housing of the processor in shape, is fixed on the outer wall surface of the housing of the processor and extends out of an outer edge of a bottom of the processor.

16. The solid-liquid separation anti-soiling toilet as claimed in claim 1, wherein both the solid container and the liquid reservoir are in transparent cavity structures.

17. A mounting method of the solid-liquid separation anti-soiling toilet as claimed in claim 1, comprising:
connecting and fixing the processor to the solid container through a limit stop; and
making a receptacle in the processor be in communication with the liquid reservoir through a liquid drain pipe.

* * * * *